US007672006B2

(12) United States Patent
Banton

(10) Patent No.: US 7,672,006 B2
(45) Date of Patent: Mar. 2, 2010

(54) MULTI-MARKING ENGINE PRINTING PLATFORM

(75) Inventor: Martin E. Banton, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1045 days.

(21) Appl. No.: 11/359,065

(22) Filed: Feb. 22, 2006

(65) Prior Publication Data

US 2007/0195355 A1 Aug. 23, 2007

(51) Int. Cl.
G06F 3/12 (2006.01)
G03G 15/00 (2006.01)
(52) U.S. Cl. ............... 358/1.15; 358/296; 358/1.18; 358/401; 358/501; 399/1; 399/9; 399/16
(58) Field of Classification Search ............. 358/1.15
See application file for complete search history.

(56) References Cited

U.S. PATENT DOCUMENTS

| 5,557,367 | A | | 9/1996 | Yang et al. |
|---|---|---|---|---|
| 5,596,416 | A | * | 1/1997 | Barry et al. ............ 358/296 |
| 5,859,711 | A | * | 1/1999 | Barry et al. ............ 358/296 |
| 6,160,559 | A | * | 12/2000 | Omtzigt ................. 345/503 |
| 6,545,766 | B1 | * | 4/2003 | Shima et al. ............ 358/1.14 |
| 6,925,283 | B1 | | 8/2005 | Mandel et al. |
| 6,959,165 | B2 | | 10/2005 | Mandel et al. |
| 6,973,286 | B2 | | 12/2005 | Mandel et al. |
| 2002/0078012 | A1 | * | 6/2002 | Ryan et al. ............ 707/1 |
| 2002/0089691 | A1 | * | 7/2002 | Fertlitsch et al. ....... 358/1.15 |
| 2003/0222396 | A1 | * | 12/2003 | Kurahashi et al. ...... 271/207 |

FOREIGN PATENT DOCUMENTS

JP 09034660 A * 2/1997

OTHER PUBLICATIONS

U.S. Appl. No. 10/785,211, filed Feb. 24, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.

(Continued)

Primary Examiner—King Y Poon
Assistant Examiner—David S Cammack
(74) Attorney, Agent, or Firm—Fay Sharpe LLP

(57) ABSTRACT

A multi-functional print platform includes at least two marking engines that process information at different processing rates and a scheduler that distributes portions of a job across the at least two marking engines based at least on a content of the job and the different processing rates of the at least two marking engines.

20 Claims, 2 Drawing Sheets

OTHER PUBLICATIONS

U.S. Appl. No. 11/000,168, filed Nov. 30, 2004, Biegelsen et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/094,988, filed Mar. 31, 2005, Moore et al.
U.S. Appl. No. 11/094,864, filed Mar. 31, 2005, de Jong et al.
U.S. Appl. No. 11/102,355, filed Apr. 8, 2005, Fromherz et al.
U.S. Appl. No. 11/109,566, filed Apr. 19, 2005, Mandel et al.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richard.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2007, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/166,299, filed Jun. 24, 2005, Moore.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongean.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/317,589, filed Dec. 23, 2005, Biegelsen et al.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.

* cited by examiner

MULTI-MARKING ENGINE PRINTING PLATFORM

CROSS REFERENCE TO RELATED PATENTS AND APPLICATIONS

The following patents/applications, the disclosures of each being totally incorporated herein by reference are mentioned:

U.S. Application No. US-2006-0012102-A1, published Jan. 19, 2006, entitled "FLEXIBLE PAPER PATH USING MULTIDIRECTIONAL PATH MODULES," by Daniel G. Bobrow; and U.S. application Ser. No. 11/349,828, filed Feb. 8, 2005, entitled "MULTI-DEVELOPMENT SYSTEM PRINT ENGINE", by Martin E. Banton.

BACKGROUND

The following relates to print platforms. It finds particular application to a print platform with at least two marking engines with different page per minute processing rates.

In conventional xerography, an electrostatic latent image is created on the surface of a photoconducting insulator and subsequently transferred to a final receiving substrate or medium. This typically involves the following. An electrostatic charge is deposited on the photoreceptor surface (e.g., by a corona discharge). The photoreceptor is exposed, which selectively dissipates the surface charge in the exposed regions and creates a latent image in the form of an electrostatic charge pattern. The image is developed by transferring electrostatically charged toner particles to the photoreceptor surface. The toner particles are then transferred to a receiving substrate or to one or more intermediate transfer elements and then to the receiving substrate. The transferred image is made permanent by various techniques, including pressure, heat, radiation, solvent, or some combination thereof.

With conventional multi-engine systems (xerographic or other) with at least one high speed marking engine (e.g., a high speed black and white marking engine) and at least one lower speed marking engine (e.g., a lower speed color marking engine) and a single print path, a print job may be distributed across the at least two marking engines. In many instances, the lower speed marking engine sends its output to a print buffer for suitable insertion into a media path at an appropriate place. This works well as long as the ratio of the page per minute rate of the lower speed marking engine to the higher speed marking engine is greater than the ratio of the number of pages processed by the lower speed marking engine to the number of pages processed by the higher speed marking engine. When this inequality is not satisfied, there may be skipped pitches in which one of the marking engines (e.g., the higher speed marking engine) sits idle while waiting for pages to be processed and delivered to the print buffer by the other marking engine (e.g., the lower speed marking engine).

BRIEF DESCRIPTION

A multi-functional print platform is illustrated. The multi-functional print platform includes at least two marking engines that process information at different processing rates. The multi-functional print platform further includes a scheduler that distributes portions of a job across the at least two marking engines based at least on a content of the job and the different processing rates of the at least two marking engines.

DETAILED DESCRIPTION

Figure 1:
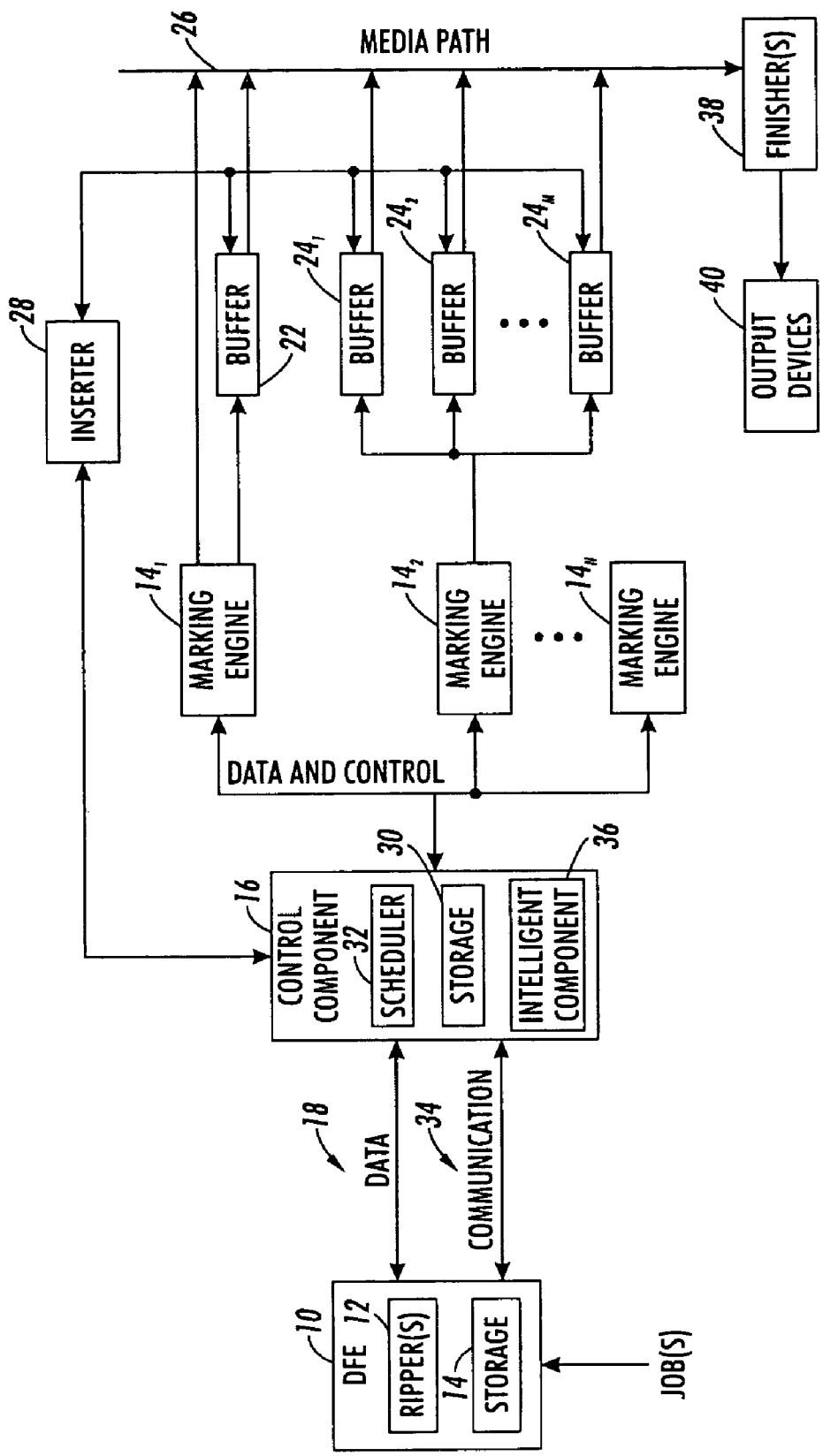
FIG. 1 illustrates a portion of a print platform that leverages various characteristics and attributes of its marking engines, the processing capabilities of its front end, and/or the content of the jobs it's processing to optimally distribute portions of the jobs across its marking engines for processing.

With reference to FIG. 1, a portion of a print platform that leverages various characteristics and attributes of its marking engines, the processing capabilities of its front end, and/or the content of the jobs its processing to optimally distribute portions of the jobs across its marking engines is illustrated. The print platform can be a multi-purpose platform having capabilities such as printing, scanning, copying, faxing, etc. simplex and/or duplex pages with color, black and white, highlight color, etc. portions within each side of each page. The print platform can include one or more independent modules (in that each module is capable of processing a job(s) independently of the other modules) that are interconnected in parallel and/or series to provide concurrent and/or serial processing of one or more jobs. Each module can include one or more marking engines, and each marking engine can be associated with similar and/or different characteristics and attributes. Example of such characteristics and attributes include, but are not limited to, a page per minute processing rate, a type(s) of toner, etc. The print platform leverages the characteristics and attributes of each of the marking engines, capabilities of the front end such as process or data conversion rate, and/or other information to improve productivity through a planning technique that optimally distributes work units or portions of a job across the marking engines to render a highly available and reliable system in which idle time of each involved marking engine is minimized.

The print platform includes a digital front end (DFE) 10 with one or more devices 12, for example, a raster image processor (RIP), that convert, translate, re-format, transform, etc. received jobs into a suitable form. For example, the one or more devices 12 can convert a RGB based job, a postscript job, and/or other job into a CMYK based and/or other job. Such processing (e.g., RIPing) can include the time it takes to read a job through the time it takes to process each page within the job into the bits that are to be printed. Each of the devices 12 are associated with a process rate that corresponds to the time it takes to convert a job and/or a page within a job from one form to another. Various factors may affect this rate. For example, the content of a particular job may affect how long it takes to process the job. For instance, a job with only black and white text typically is processed faster than a job that includes color, graphics, pictures, etc. In another example, characteristics of each devices 12 may affect the process rate. For instance, the health of each device 12, the current load on each device 12, etc. may affect the speed at which a particular one of the devices 12 can process jobs.

The jobs can come from various sources such as a portable storage medium (e.g., CD, DVD, optical disk, Flash memory, stick memory, magnetic tape, floppy disk, etc.), a component on a bus or network over the bus or network (via wire or wirelessly), a computer, another print platform, an email server, a facsimile, a user interface within the print platform, etc. Each job can be queued in a storage component 14 until a suitable device 12 becomes available, and/or each processed job can be stored in the storage component 14 and/or conveyed to a control component 16 over a data channel 18. Such conveyance can be automatic, for example, upon processing a job, and/or on-demand, for example, upon a request for a particular job or a particular ordering of jobs.

The control component 16 controls one or more marking engines $14_1, 14_2, \ldots, 14_N$, wherein N is an integer equal to or greater than one. The marking engines $14_1, 14_2, \ldots, 14_N$, are collectively referred to herein as the marking engines 14. Each of the marking engines 14 is associated with one or more processing elements such as one or more cleaners, chargers, expose units, developers, photoreceptors, etc. In addition, each of the marking engines 14 can include similar or different capabilities. For instance, one or more of the marking engines 14 can be color marking engines. In another instance, one or more of the marking engines 14 can be low cost-per-page black and white marking engines. In another instance, one or more of the marking engines 14 can be black and white and highlight color marking engines. In yet another instance, one or more of the marking engines 14 can include one or more different types of toner (e.g., a flat black, a low gloss black, a high gloss black, magnetic toner, etc.). It is to be appreciated that the above examples are provided for illustrative purposes and are not limiting. Thus, various other marking engine configurations are also contemplated herein.

Depending on the particular configuration, each of the marking engines 14 can be associated with a substantially similar and/or different processing rate, such as substantially similar and/or different page per minute processing rate. For example, a typical high speed marking engine may be capable of processing about 110 to about 150 (or more or less) pages per minute, whereas a lower speed marking engine may be associated with a processing rate of about 40 to about 60 (or more or less) pages per minute. In one instance, the high speed marking engine can be a black and white marking engine capable of printing at a rate of about 120 or about 140 pages per minute. In another instance, the lower speed marking engine can be a color marking engine capable of printing at a rate of about 50 pages per minute.

Each of the marking engines 14 can be associated with one or more buffers. For example, the marking engine $14_1$ is depicted with a single buffer 22, marking engine $14_2$ is depicted with a plurality of buffer $24_1, 24_2, \ldots, 24_M$ (wherein M is an integer equal to or greater than one), and the marking engine $14_N$ is not associated with a buffer. The buffers 22 and the buffers $24_1$-$24_M$ (collectively referred to as buffers 24) can be used to temporarily store processed work units or portions of a job until such those portions can be appropriately inserted, merged, etc. into a media path 26, which can include a single media path or multiple media paths. For example, both the marking engines $14_1$ and $14_2$ can process different portions of a job that need to be inserted into the media path 26 in a particular order and at different times. Upon processing a particular portion of a job, these marking engines $14_1$ and $14_2$ can insert the processed portions directly into the media path 26 and/or buffer one or more processed portions in the buffers 22 and/or one or more of buffers 24 until the processed portion can be correctly inserted into its position. The marking engine $14_2$ and/or other ones of the marking engines 14 that have multiple buffers can use different ones of the multiple buffers to hold processed portions corresponding to different jobs. Thus, the marking engine $14_2$ can store processed portions of a first job in the buffer $24_1$, processed portions of another job in the buffer $24_2$, etc.

An inserter 28 facilitates inserting, merging, etc. buffered portions of a job into the media path 26. The inserter 28 is controlled by the control component 16, which informs the inserter 28 of the job(s) being processed, scheduled jobs queued in a storage component 30, jobs waiting to be scheduled, the ordering of the jobs, which jobs are being processed by which marking engines, which buffers are used for each job, etc. With this information, the inserter 28 manages the buffers 22 and 24. The inserter 28 can also notify the control component 16 if one or more of the buffers 22 and 24 are not properly operating and/or a processed portion of a job has not been properly processed and/or inserted. In the latter case, the media path 26 may include a loop or other structure to allow the processed portions to be cycled through the individual buffers a second, third, fourth, etc. time in order to facilitate correctly inserting the processed portions into the media path 26. In another instance, the buffers 22 and 24 may be directed to route any processed portions to a purge tray or the like, wherein an entire job is re-queued and sent to the marking engines 14 again.

The control component 16 includes a scheduler 32, which determines a strategy for processing jobs via a planning process. Before, during and/or after planning, the control component 16 can communicate with the DFE 10 over a communication channel 34 to obtain various information about jobs (and/or pages therein) received by the DFE 10, pages and/or jobs processed by the DEE 10, pages and/or jobs conveyed to the control component 16, and/or pages and/or jobs being processed. Such information can include the process rate associated with each job and/or each page of one or more of the jobs. In one instance, the reported process rate is the actual process rate that is measured during the process. In another example, the process rate is default process rate used for pages and/or jobs that meet various criteria. For example, a process rate may be assigned to a page and/or job based on the size of the page and/or job, whether the page and/or job includes color, whether the page and/or job includes any graphics, the particular device 12 used to process the page and/or job, etc. In another instance, process rates can be periodically measured and the latest and/or some average of past rip rates can be used to anticipate the time it will take to process a page and/or job waiting to be processed. In yet another instance, the process rate can be estimated. Such measuring and/or estimating can be performed by the DEE 10 and/or an intelligent component 36 residing within the control component 16. The intelligent component 36 may employ statistics, probabilities, classifiers, neural networks, and the like to infer a likely process rate for each device 12 and/or each job. In still another instance, such information can be directly provided to the control component 16, for example, as a file, a look-up table, etc. by a user or other entity and stored in the storage component 30. The intelligent component 36 can also decide how much of the processing resources are available to assign to any page and/or job.

The control component 16 also communicates with the marking engines 14 and/or buffers 22 and 24 to obtain various information about the capabilities and state of each of the marking engines 14 and/or buffers 22 and 24. Such information can include the page per minute processing rate of each of the marking engines 14, the health of each of the marking engines 14, the current load on each of the marking engines 14, the health of each of the buffers 22 and 24, the current load on each of the buffers 22 and 24, etc. The processing rate of each of the marking engines 14 may be dynamically measured in real-time as the marking engines 14 are processing portions of jobs. Such measurements can be performed by the control component 16, the intelligent component 36, and/or another component. Alternatively, the rates may be determined ahead of time, for example, by the manufacturer. Such information may be stored with the marking engines 14, for example, within a configuration file and/or included in documentation. In another instance, the information may be stored in the storage component 30, for example, within a marking engine specific configuration file and/or a generic configuration file that distributes marking engine configuration by each of the marking engines 14. Since the processing rate of the various marking engines can also depend on characteristics of the print media used for processing each job, the control component 16 can communicate with the DFE 10 to obtain information such as the weight of the media, the size of the media, etc.

The above discussed information about the one or more devices 12 and/or marking engines 14, as well as other information, is used by the scheduler 32 when generating a job processing plan. For instance, the scheduler 32 can use the processing rate of each of the marking engines 14 to determine an optimal ordering of the jobs. By way of non-limiting example, assume the marking engine 14$_1$ is a high speed black and white printer with a processing rate of X (e.g., about 144) pages per minute and the marking engine 14$_2$ is a lower speed color printer with a processing rate of Y (e.g., about 50) pages per minute, wherein X>Y and both X and Y are real numbers. Also assume that the color buffers 24 associated with the marking engine 14$_2$ include multiple color buffers. Also assume the media path 26 includes a single media path.

With the above configuration, the scheduler 32 (alone or in concert with the intelligent component 36) can classify received jobs based on some criterion, such as, for example, a ratio of the number of color pages to the number of black and white pages and a ratio of the color marking engine processing rate to the black and white marking engine processing rate. For instance, the classification can be such that the ratio of color marking engine processing rate to the black and white marking engine processing rate is greater than the ratio of the number of color pages to the number of black and white pages. Using this formulation and knowing the marking engine 14$_2$ has M color buffers, the scheduler 32 can order jobs, as far as possible, such that they will be printed in an order that will satisfy the following inequality:

$$\left[\sum_{i=1}^{M}(N_{pagesC})\bigg/\sum_{i=1}^{M}(N_{pagesBW})\right]\bigg/R_{ppmCppmBW}<1,$$

wherein $N_{pagesC}$ is a number of color pages and $N_{pagesBW}$ is a number of black and white pages for an ith job, $R_{ppmCppmBW}$ is a ratio of a color page per minute processing rate to a black and white page per minute processing rate, and M is a number of color buffers associated with the color marking engine. The above inequality can be extended by including the processing rate of the devices 12. In this instance, the scheduler 32 can order jobs, as far as possible, such that they will be printed in an order that will satisfy the following inequality:

$$\left[\sum_{i=1}^{M}(N_{pagesC}\times S_{pagesC})\bigg/\sum_{i=1}^{M}(N_{pagesBW}\times S_{pagesBW})\right]\bigg/R_{ppmCppmBW}<1,$$

wherein $S_{pagesC}$ is a process rate for each color page and $S_{pagesBW}$ is a process rate for each black and white page. Thus, this inequality takes into consideration the individual process rates for each page within the ith job. Satisfying either of these inequalities will lead to a maximum productivity for the page per minute rates of the color and black and white marking engines. It is to be understood that variations of the above inequalities and/or other criterion can additionally or alternatively be used by the scheduler 32.

By way of example, the ordering of jobs may include selecting an initial job with more black and white pages than color pages since the black and white pages typically are processed at a faster rate. In addition, the job may be selected such that color pages are far enough down the line that the marking engine(s) used to print the black and white pages will not have to wait for the marking engine(s) processing the color pages. In some instances, this may not be possible (e.g., where there is a large number of color pages in a row) so the buffers are used. Remaining jobs can be ordered so that the color marking engine(s) can process portions of the remaining jobs instead of sitting idle while the black and white marking engine(s) is processing the black and white portions of the initial job. The foregoing example is provided for explanatory purposes. Various other scenarios can be appreciated and are contemplated, but are not included for sake of brevity and clarity.

The media path 26 conveys the processed pages to one or more finishers 38. In instances in which the print platform includes multiple finishers, several jobs can be concurrently processed. Such finishers 38 can perform various finishing operations and/or be by-passed, for example, through an alternate path (not shown) or simply by-passing through with the finishers 38. The processed jobs are then fed to one or more output devices 40 such as one or more other print engines, output trays, other print platforms, shredders, etc.

The above example was discussed in terms of a color marking engine and a black and white marking engine; however, it is to be understood that the above inequalities and/or variations thereof can be used to facilitate scheduling for any types of different speed marking engines. For example, the at least two marking engines may both be black and white marking engines with different processing rates, etc. In addition, other criteria can additionally or alternatively be used by the scheduler 32. Such criteria can be overridden by a user and/or in instances in which the intelligent component 36 and/or other component determines that the ordering should be based on other criteria. Further, the above examples only consider two of the N marking engines 14 for sake of brevity. However, the scheduler 32 can determine an ordering based on any number of the N marking engines 14, including all of the marking engines 14.

Figure 2:
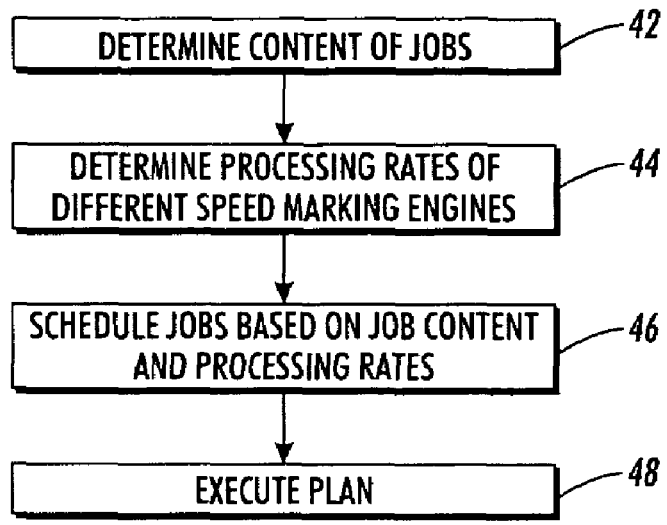
FIG. 2 illustrates a method for optimally processing portions of one or more jobs across different speed marking engines based on marking engine processing rates and the content of the pages and/or jobs to be processed.

FIG. 2 illustrates a method for optimizing productivity in a printing system. At reference numeral 42, the contents of one or more jobs to be processed are determined. Such contents can include information such as the number of pages within each job, whether each job includes color portions, black and white portions, highlight color portions, portions with graphics, portions with pictures, portions to be processed with magnetic toner, portions with line art, etc. This information can be determined by a front end of the print platform, a scheduler, an intelligent component, and/or otherwise. At 44, processing rates of at least two marking engines with different processing rates are determined. Such processing rate includes a number of pages per minute that each of the at least two marking engines is capable of processing. For example, one of the marking engines may be a high speed marking while another of the marking engines may be a lower speed marking engine. Other information that may affect the processing rate such as a health of each marking engine, a current load on each marking, etc. may also be determined. The processing rates and other information can be pre-determined and/or determined by the print platform, the scheduler, the intelligent component, and/or otherwise. It is to be appreciated that the content of the one or more jobs and the processing rates of the at least two marking engines can be determined in any order, including concurrently.

At 46, the one or more jobs are scheduled based the content of the one or more jobs and the processing rates of the at least two marking engines. In one instance, this includes scheduling the one or more jobs based on the number of color and black and white pages and the page per minute processing rate of the at least two marking engines. For example, the one or more jobs can be based on the following:

$$\left[\sum_{i=1}^{M}(N_{pagesC})\bigg/\sum_{i=1}^{M}(N_{pagesBW})\right]\bigg/R_{ppmCppmBW}<1,$$

wherein $N_{pagesC}$ is a number of color pages and $N_{pagesBW}$ is a number of black and white pages for an ith job, $R_{ppmCppmBW}$ is a ratio of a color page per minute processing rate to a black and white page per minute processing rate, and M is a number of color buffers associated with the color marking engine. Satisfying this inequality will lead to a maximum productivity for the page per minute rates of the color and black and white marking engines, given the information used in the inequality. It is to be appreciated that other information (e.g., page and/or job processing rates) can be incorporated into this inequality to further improve or refine the results.

At 48, the processing plan is executed by the at least two marking engines. During processing, the M color buffers are used to hold color pages until they can be suitably inserted, merged, etc. into a media path. For example, the job may include substantially more black and white pages than color pages in which a number of black and white pages occur before a color page. The lower speed marking engine may process the first color page while the higher speed marking engine processes the initial black and white page. Upon processing the first color page, it may need to be queued in a color buffer until it can be inserted into a correct order in the media path. For example, if the color page is the jth page of the job and it may have to be queued until the ith page is processed and merged into the media path. Using the above formulation, the one or more jobs are distributed across the at least two marking engines such that the idle time of any marking engine is minimized. In instances in which multiple color buffers are available, multiple print jobs can be processed. Where multiple finishers are also available, several jobs can be concurrently processed. The processed jobs are then fed to one or more output devices such as output trays, other print platforms, shredders, etc.

Figure 3:
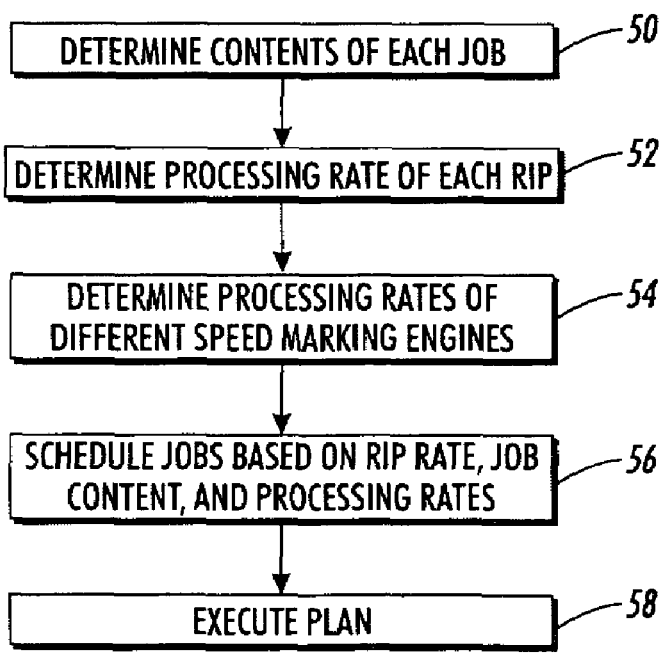
FIG. 3 illustrates a method for optimally processing portions of one or more jobs across different speed marking engines based on the data conversion processing rate of each page and/or job, the processing rates of the different speed marking engines, and the content of the pages and/or jobs to be processed.

FIG. 3 illustrates an alternative method for optimizing productivity in a printing system. At 50, the contents of one or more jobs to be processed are determined as described above. At 52, a processing (e.g., RIP, RIPing) rate of one or more processors (e.g., raster image processors (RIPs)) that convert received jobs into a form for processing by at least two marking engines is determined. Such processing (e.g., RIPing) may include converting a RGB based job, a postscript job, and/or other job into a CMYK based and/or other job. As discussed above, various factors may affect this rate, including the content of a job, which may include black and white portions, color portions, graphics, pictures, etc. The processing rate can be pre-determined and/or determined by a front end of the system, a scheduler, an intelligent component, and/or otherwise. At 54, processing rates (e.g., page per minute, etc.) of at least two marking engines with different processing rates are determined as described above. It is to be appreciated that the data conversion processing rate, the contents of the one or more jobs, and the processing rates of the at least two marking engines can be determined in any order, including concurrently.

At 56, the one or more jobs are scheduled based the data conversion processing rate, the content of the one or more jobs, and the processing rates of the at least two marking engines. For example, the one or more jobs can be scheduled base on the following:

$$\left[\sum_{i=1}^{M}(N_{pagesC}\times S_{pagesC})\bigg/\sum_{i=1}^{M}(N_{pagesBW}\times S_{pagesBW})\right]\bigg/R_{ppmCppmBW}<1,$$

wherein $N_{pagesC}$ is a number of color pages and $N_{pagesBW}$ is a number of black and white pages for an ith job, $S_{pagesC}$ is a process rate for each color page and $S_{pagesBW}$ is a process rate for each black and white page, $R_{ppmCppmBW}$ is a ratio of a color page per minute processing rate to a black and white page per minute processing rate, and M is a number of color buffers associated with the color marking engine. Satisfying this inequality will lead to a maximum productivity for the page per minute rates of the color and black and white marking engines and the data conversion processing rates.

At 58, the processing plan is executed by the at least two marking engines. As described above, during processing, the M color buffers can be used to hold color pages until they can be suitably inserted into a media path. In addition, this formulation provides for scheduling and processing of the one or more jobs such that the idle time of any marking engine is minimized.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multi-functional print platform, comprising:
at least two marking engines that process information at different processing rates; and
a scheduler that distributes portions of a job across the at least two marking engines based at least on a content of the job and the different processing rates of the at least two marking engines, and schedules job orders as a function of the inequality:

$$\left[\sum_{i=1}^{M}(N_{pagesC}) \bigg/ \sum_{i=1}^{M}(N_{pagesBW})\right] \bigg/ R_{ppmCppmBW} < 1,$$

wherein $N_{pagesC}$ is a number of color pages and $N_{pagesBW}$ is a number of black and white pages for an ith job, $R_{ppmCppmBW}$ is a ratio of a color page per minute processing rate of a color marking engine to a black and white page per minute processing rate of a black and white marking engine, and M is a number of color buffers associated with the color marking engine.

2. The multi-functional print platform as set forth in claim 1, wherein the processing rates of the marking engines are page per minute processing rates.

3. The multi-functional print platform as set forth in claim 1, wherein one of the at least two marking engines is a high speed black and white marking engine and another of the at least two marking engines is a lower speed color marking engine.

4. The multi-functional print platform as set forth in claim 1, further including at least one color buffer coupled to a lower speed color marking engine in which the color buffer is used to hold processed color portions of the job for appropriate insertion into a media path.

5. The multi-functional print platform as set forth in claim 1, further including at least two color buffers coupled to a lower speed color marking engine in which each color buffer is used to facilitate processing color portions of different jobs.

6. The multi-functional print platform as set forth in claim 1, further including a plurality of finishers for concurrently processing a plurality of jobs in which each finisher is used to facilitate processing a different one of the plurality of jobs.

7. The multi-functional print platform as set forth in claim 1, wherein the scheduler communicates with a device that converts jobs to a suitable format for processing by the at least two marking engines in order to determine a conversion rate of the device.

8. The multi-functional print platform as set forth in claim 7, wherein the conversion rate is one of an estimated, inferred, averaged, default, and actual conversion rate.

9. The multi-functional print platform as set forth in claim 1, wherein the scheduler monitors the at least two marking engines in order to determine a processing rate of each of the at least two marking engines.

10. The multi-functional print platform as set forth in claim 1, further including a single media path in which processed color and black and white pages are inserted into in a particular order.

11. The multi-functional print platform as set forth in claim 1, further including multiple media paths, each associated with different job, for concurrently processing multiple jobs.

12. The print platform of claim 1, wherein at least two of the marking engines are black and white.

13. A method for optimally printing with multiple marking engines, comprising:
determining one or more characteristics of a job;
determining a processing rate of at least two marking engines with different processing rates; and
processing different portions of the job with the at least two marking engines based on the one or more characteristics of the job and the marking engine processing rates, and scheduling job orders as a function of at least one of the following inequalities:

$$\left[\sum_{i=1}^{M}(N_{pagesC}) \bigg/ \sum_{i=1}^{M}(N_{pagesBW})\right] \bigg/ R_{ppmCppmBW} < 1,$$

wherein $N_{pagesC}$ is a number of color pages and $N_{pagesBW}$ is a number of black and white pages for an ith job, $R_{ppmCppmBW}$ is a ratio of a color page per minute processing rate of a color marking engine to a black and white page per minute processing rate of a black and white marking engine, and M is a number of color buffers associated with the color marking engine; and $$\left[\sum_{i=1}^{M}(N_{pagesC} \times S_{pagesC}) \bigg/ \sum_{i=1}^{M}(N_{pagesBW} \times S_{pagesBW})\right] \bigg/ R_{ppmCppmBW} < 1,$$

wherein $N_{pagesC}$ is a number of color pages and $N_{pagesBW}$ is a number of black and white pages for an ith job, $S_{pagesC}$ is a process rate for each color page and $S_{pagesBW}$ is a process rate for each black and white race, $R_{ppmCppmBW}$ is a ratio of a color page per minute processing rate of a color marking engine to a black and white page per minute processing rate of a black and white marking engine, and M is a number of color buffers associated with the color marking engine.

14. The method as set forth in claim 13, further including buffering portions of the job processed by at least one of the at least two marking engines in order to suitably insert the processed portions into a media path.

15. The method as set forth in claim 13, further including concurrently processing different portions of at least one additional job with the two or more marking engines based on the one or more characteristics of the job and the marking engine processing rates.

16. The method as set forth in claim 13, further including:
determining a rate at which the job is processed to a format suitable to the at least two marking engines; and
processing the different portions of the job based on the one or more characteristics of the job, the marking engine processing rates, and the job re-formatting processing rate.

17. The method as set forth in claim 16, further including concurrently processing different portions of at least one additional job with the two or more marking engines based on the one or more characteristics of the job, the marking engine processing rates, and the job re-formatting processing rate.

18. A xerographic device, comprising:
at least one device that converts a received job to a suitable format at a rate based on a content of the received job;
at least two marking engines that process different portions of job at different processing rates;
at least one buffer associated with at least one of the at least two marking engines, the at least one buffer is used to buffer processed portions of the job to facilitate suitable insertion of the processed portions into a media path; and
a scheduler that distributes portions of a job across the at least two marking engines based at least on the content of the job and the processing rates of the at least two marking engines; wherein the scheduler schedules jobs as a function of the following inequality:

$$\left[\sum_{i=1}^{M}(N_{pagesC} \times S_{pagesC}) \Big/ \sum_{i=1}^{M}(N_{pagesBW} \times S_{pagesBW})\right] \Big/ R_{ppmCppmBW} < 1,$$

wherein $N_{pagesC}$ is a number of color pages and $N_{pagesBW}$ is a number of black and white pages for an ith job, $S_{pagesC}$ is a process rate for each color page and $S_{pagesBW}$ is a process rate for each black and white page, $R_{ppmCppmBW}$ is a ratio of a color page per minute processing rate of a color marking engine to a black and white page per minute processing rate of a black and white marking engine, and M is a number of color buffers associated with the color marking engine.

19. The xerographic device as set forth in claim 18, wherein the scheduler further bases the distribution of the portions of the job to the at least two marking engines based on the processing rate of the at least one raster image processor (RIP).

20. The xerographic device of claim 18, wherein at least two marking engines are black and white.

* * * * *